(12) United States Patent
Anderson et al.

(10) Patent No.: US 6,213,471 B1
(45) Date of Patent: Apr. 10, 2001

(54) SEAL ASSEMBLY WITH STABILIZED SEAL RINGS

(75) Inventors: Michael D. Anderson, Franklin, NC (US); Billy R. Bedford, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/197,082

(22) Filed: Nov. 19, 1998

(51) Int. Cl.$^7$ .................................................. B62D 55/15
(52) U.S. Cl. ............................ 277/380; 277/370; 277/375
(58) Field of Search ........................... 277/380, 370, 277/375, 385, 390, 396, 397

(56) References Cited

U.S. PATENT DOCUMENTS

| | | | |
|---|---|---|---|
| 3,167,321 | * | 1/1965 | Land et al. ............................ 277/380 |
| 3,409,306 | * | 11/1968 | Hayatian ............................... 277/380 |
| 4,489,952 | | 12/1984 | Ohtsuka . |
| 4,821,536 | | 4/1989 | Bardsley . |
| 5,527,046 | | 6/1996 | Bedford . |
| 5,553,931 | * | 9/1996 | Diekevers ............................ 305/100 |
| 5,762,343 | * | 6/1998 | Zutz .................................... 277/380 |

FOREIGN PATENT DOCUMENTS 1361407    12/1987   (SU) .

OTHER PUBLICATIONS

U.S. Patent application No. 08/918,992, filed Aug. 27, 1997—"Metal Ring Seal".
U.S. Provisional Patent application No. 60/069,386, filed Dec. 12, 1997, "Face Seal Assembly with Interfitting Load Ring".

\* cited by examiner

*Primary Examiner*—Anthony Knight
*Assistant Examiner*—Mark Williams
(74) *Attorney, Agent, or Firm*—William C. Perry; Calvin E. Glastetter

(57) ABSTRACT

Metal-to-metal face seals are commonly used between relatively rotating components to maintain a quantity of lubricating fluid within one component while keeping dirt and abrasives from entering. The positioning of the sealing faces of the seal rings is critical to their function and, for any number of reasons, the interface between the seal rings has been known to become angled with respect to the axis about which they are positioned. The present invention provides a seal assembly that have a pair of seal rings that are maintained in engaging contact with one another by a pair of load rings. Each load ring has a first end portion that engages the respective seal ring and a second end portion that engages a recess in an adjacent housing. The recess defines an angled surface that is adapted for engagement with an annular surface of the load ring to stabilize the seal assembly to maintain proper positioning of the seal rings.

10 Claims, 2 Drawing Sheets

SEAL ASSEMBLY WITH STABILIZED SEAL RINGS

TECHNICAL FIELD

This invention relates generally to a metal-to-metal face seal assembly and more particularly to such a seal assembly that is adapted for engagement with a pair of relatively rotating housings in a manner that provides improved stability of the seal assembly.

BACKGROUND ART

Known face seal assemblies for use in constructions having relatively rotating components, such as track roller assemblies of tracked machines, final drives, etc., typically comprise a pair of confronting seal rings of metal or other durable, hard material. The seal rings rotate relative to one another in face-to-face contact to provide a positive face seal, which retains lubricant and prevents foreign matter from reaching the internal bearing surfaces of the rotating assembly. Contact between the seal faces is maintained by a pair of resilient load rings which engage and press against each seal ring to thereby force the seal faces against one another. An example of such a seal assembly is described in commonly-owned U.S. Pat. No. 5,527,046, issued Jun. 18, 1996, to Billy R. Bedford.

Under certain conditions, the force applied by the respective load rings can become unequal and the seal assembly can become "tipped", causing the seal faces to be tilted with respect to the axis of rotation. While this condition does not necessarily cause the seal to malfunction, it can limit the amount of misalignment the seal assembly can accommodate. Misalignment beyond this limited amount could cause the seal rings to separate, causing a temporary loss in sealing capability in which dirt and other abrasives would be allowed to reach the internally lubricated bearings of the rotating assembly.

The present invention is directed to overcoming one or more of the problems set forth above.

DISCLOSURE OF THE INVENTION

In one aspect of the present invention, a seal assembly is provided. The seal assembly is adapted for use with a first and second housing, each of which defines a recess therein. First and second seal rings having mutually confronting annular sealing faces are positioned between the first and second housings. First and second load rings are provided, each having a first and second end portion and an annular surface that extends therebetween. The load rings are positioned with their respective first end portions engaged with opposing ones of the first and second seal rings. The second end portions of the respective load rings are positioned for engagement with opposing ones of the first and second housings. The load rings are adapted to urge the respective annular sealing faces of the respective seal rings into engagement with one another. An angled surface is defined by at least one of the recesses defined by the first and second housings. The angled surface is positioned in closely adjacent relation to the annular surface of the respective load ring.

In another aspect of the present invention, a seal assembly is provided that has first and second housings that are positioned adjacent one another and are mounted for relative rotation with respect to one another. A pair of seal rings is provided that has mutually confronting annular seal faces. A pair of first and second corresponding load rings is included that has a first end portion adapted to engage a corresponding seal ring and a second end portion adapted to engage one of the first and second housings. An outwardly directed annular surface that extends between the first and second end portions of the load rings. The load rings apply force to the corresponding seal rings to thereby maintain the seal faces in sealing engagement. A pair of recesses is defined in each of the first and second housing. Each recess has a first axially directed surface and a second radially directed surface that extend from the first surface. An angled surface extends from the second surface and is positioned in closely adjacent relation to the annular surfaces of the respective load rings.

With a seal assembly as set forth above, the recess defined in one or more of the housings is provided with an angled surface that is in close proximity to the annular outer surface defined by the load ring. Being so positioned, the load ring may contact the angled surface to provide support therefore and thus stabilized the entire seal assembly. The additional stability helps maintain the respective seal faces at a proper angle, thus allowing them to perform up to their expected capability.

BEST MODE FOR CARRYING OUT THE INVENTION

Figure 1:
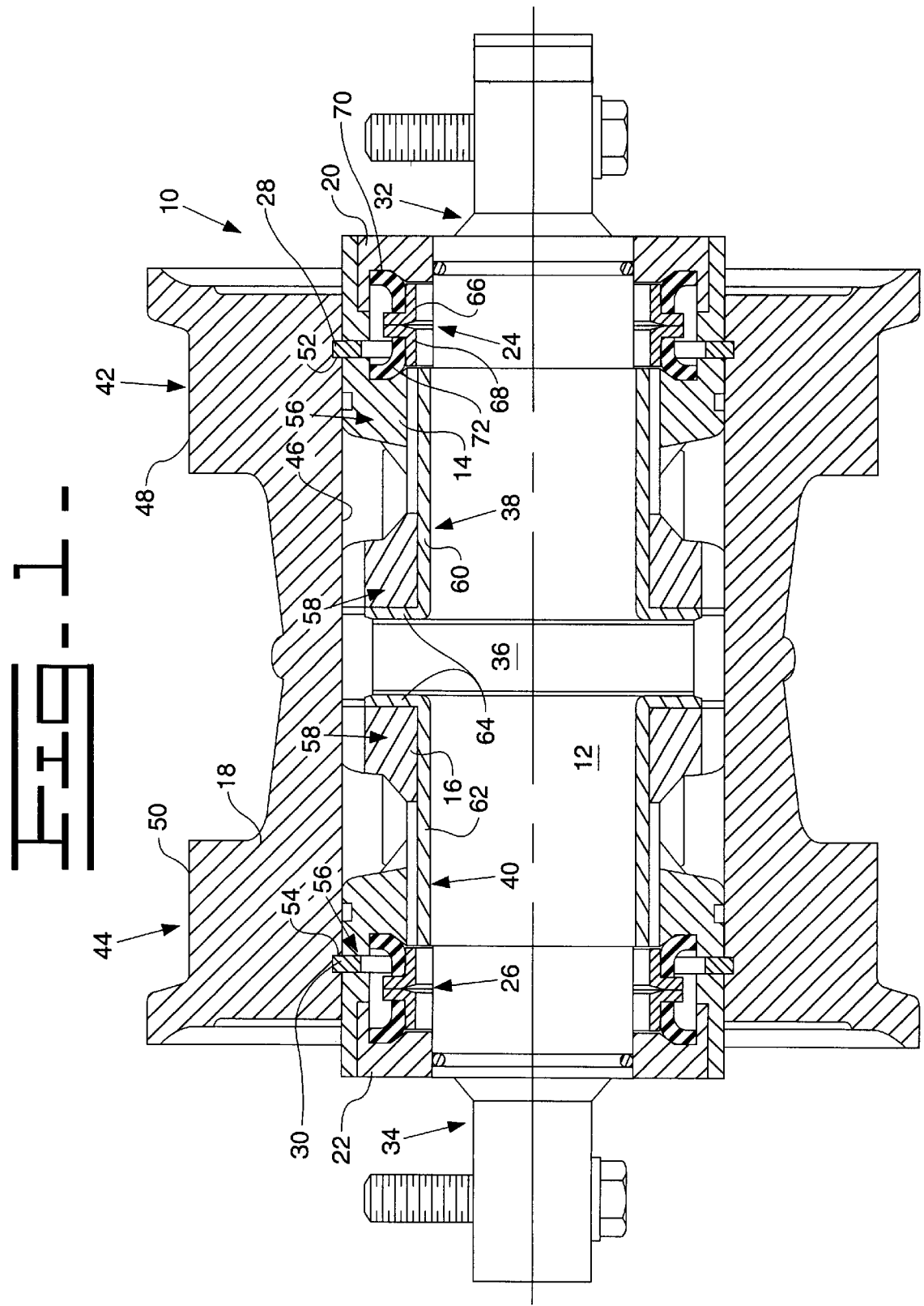
FIG. 1 is a diagrammatic, partially cross-sectional view of a track roller assembly incorporating a pair of seal assemblies in accordance with this invention.
Figure 2:
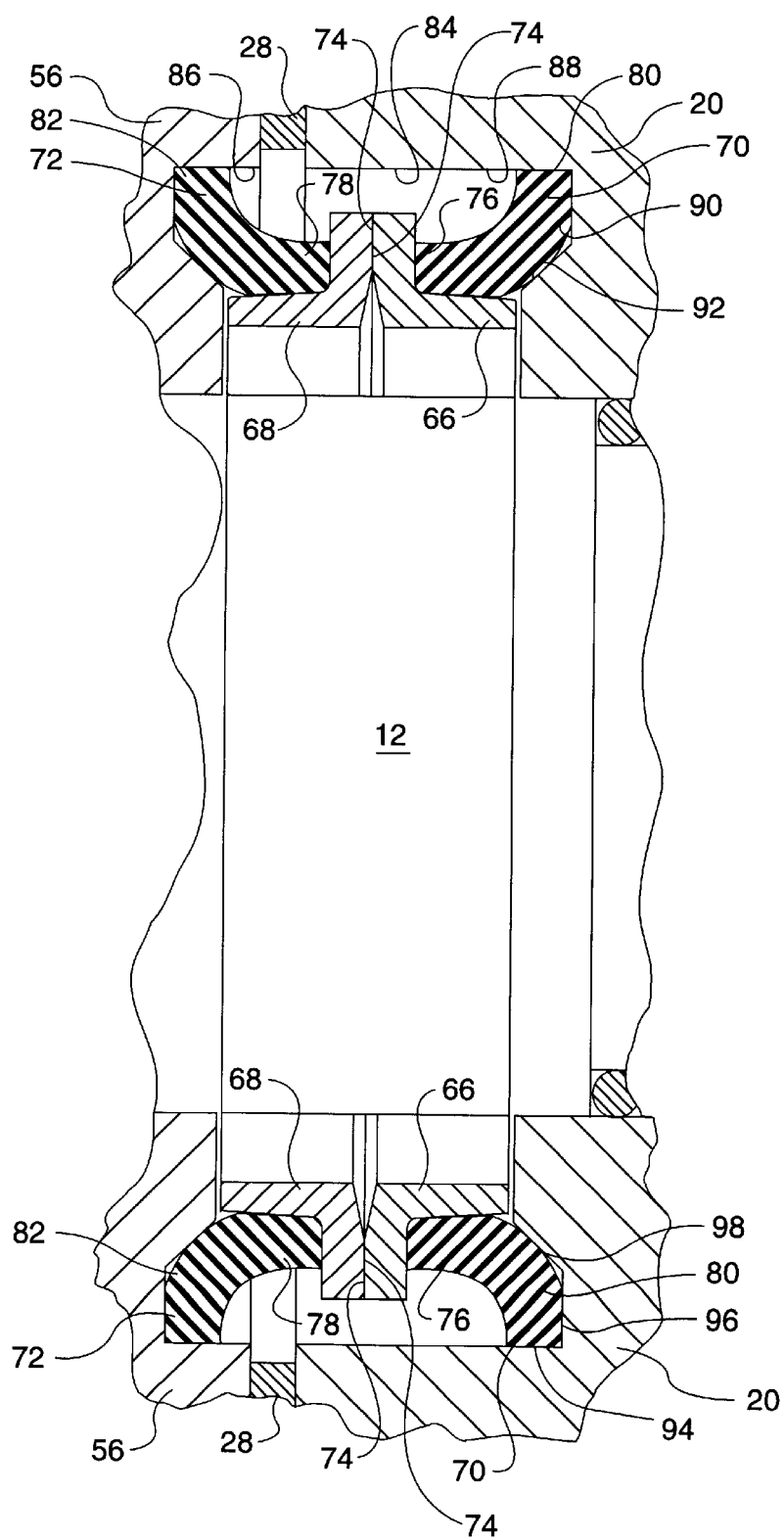
FIG. 2 is an enlarged cross-sectional view of a portion of one of the seal assemblies illustrated in FIG. 1.

With reference to FIGS. 1 and 2, this invention is illustrated with respect to a track roller assembly, generally designated 10, for guiding the track (not shown) of a track-type machine (not shown). While this invention is shown for use in a track roller, it is to be understood that the invention may be used in other designs, such as final drive assemblies, wherein sealing is required between two relatively rotating components. The track roller assembly 10 includes a central supporting shaft 12, first and second bushings 14,16, a roller shell 18, first and second end caps 20,22, first and second seal assemblies 24,26, and first and second split metal retaining rings 28,30, which secure the roller shell 18 in a fixed position with respect to the bushings 14,16 and the shaft 12. The first and second end caps 20,22 are preferably press-fitted to the shaft 12 and the first and second bushings 14,16 are preferably press-fitted to the roller shell 18. The supporting shaft 12 has first and second end portions 32,34, a central flange portion 36, and first and second bushing supporting portions 38,40 which are positioned respectively between the central flange portion 36 and the first and second end portions 32,34. The first and second bushings 14,16 are positioned on respective first and second bushing supporting portions 38,40 of the supporting shaft 12.

The roller shell, 18 has first and second tread portions 42,44 and an internal through bore 46 with the supporting shaft 12 and bushings 14,16 being adapted to fit within the bore 46. The tread portions 42,44 have respective contact surfaces 48,50 which are adapted to contact the endless track (not shown) of the track-type machine (not shown).

The first and second end caps 20,22 are positioned on respective first and second shaft end portions 32,34 and substantially close off each end of the internal bore 46. The first and second seal assemblies 24,26 are positioned between respective first and second bushings 14,16 and first and second end caps 20,22. The seal assemblies 24,26 prevent leakage of lubricating fluid out of the internal bore 46 and prevent dirt and other foreign material from entering the internal bore 46.

The track roller shell 18 has first and second circular grooves 52,54 formed in the internal bore 46 and the split retaining rings 28,30 are adapted to fit within respective grooves 52,54. Each of the bushings 14,16 has first and second end portions 56,58 with the first end portions 56 being adapted to contact one of the split rings 28,30 and the second end portions 58 being adapted to contact the central flange portion 36 of the supporting shaft 12. The track roller assembly 10 further includes first and second bearing sleeves 60,62, with each sleeve 60,62 having a radially extending flange portion 64. The bearing sleeves 60,62 are positioned between the respective first and second bushing supporting portions 38,40 and the first and second bushings 14,16. The flange portion 64 of each sleeve 60,62 is positioned between the central flange portion 36 of the shaft 12 and the second end portion 58 of one of the bushings 14,16.

Each of the seal assemblies 24,26 includes first and second metal seal rings 66,68 and first and second resilient load rings 70,72. The seal rings 66,68 are substantially similar with each seal ring 66,68 having a seal face 74 which mates with a like seal face 74 on a mating seal ring 66,68 in the assembled condition of the seal assembly 24,26. The resilient load rings 70,72 are also substantially similar and are adapted to apply a force to the seal rings 66,68 and the seal faces 74. Each of the resilient load rings 70,72 is cup-shaped, is columnar in cross-section, and is configured similar to the load rings described in the aforementioned 5,527,046 patent. The manner in which the seal faces 74 are maintained in sealing engagement by the load rings 70, 72 is well known in the art and is not described further herein.

Referring to FIG. 2, it can be seen that each of the load rings 70, 72 has a first end portion 76,78 that engages the respective seal rings 66,68 on a side thereof in direct opposition to the seal faces 74. The load rings have a second end portions 80,82 that engages the respective recesses 84,86 defined in the respective end cap 20 and the first end portion 56 of bushing 14. For purposes of clarity, only recess 84 will be described in detail, it being understood that the recesses in the other end cap 22 and both bushings 14 and 16 may be identical in configuration.

Recess 84 defines a first surface 88 that extends generally in an axial direction. A second surface 90 extends from the first surface 88 in a generally radial direction. The second surface 90 defines an angled surface 92 at a location that is spaced from the first surface 88 in a radial direction. The second end portion 80 of the load ring 70 is shown to define a first surface 94 that is positioned to engage the first surface 88 of the recess. A second surface 96 of the second end portion 80 is shown to engage the second surface 90 defined by the recess 84. In the illustrated embodiment, an outwardly directed annular surface 98 is shown to extend between the first and second end portions 76 and 80, respectively, of the load ring 70. The annular surface 98 is positioned in closely adjacent relation to or in contact with the angled surface 92 of the recess 84 to limit the axial movement of the load ring 70.

INDUSTRIAL APPLICABILITY

In operation, the seal assemblies 24, 26 extend between the respective stationary end caps 20 and 22 of the track roller assembly and the rotating bushings 14 and 16. The seal faces 74 of the seal rings 66 and 68 are maintained in sealing engagement by the load rings 70 and 72. As the seal ring 72 rotates with respect to the seal ring 70, a sealing interface is maintained therebetween to prevent dirt and/or other abrasives from entering into the area of the shaft 12. In doing so, the related bushings and bearings which are continuously lubricated in a bath of fluid maintained within the track roller, are protected from premature wear.

It can be seen that in the seal assemblies 24, 26 described above, the seal surfaces 74 are maintained in proper alignment due to the relationship between the load rings 70, 72 and the recesses 84, 86 defined by the housing in which they reside. Since the annular surface 98 of the load ring 70 is positioned in closely adjacent relationship to the angled surface 92 defined by the recesses 84, the axial movement of the load ring, and thus the seal rings is limited. By limiting the movement of the load ring, the position of the seal rings, and thus the seal faces 74 is stabilized. For even more stability, an angled surface similar to that defined by recess 84 may also be incorporated into the structure of all recesses to limit the movement of all load rings. Ultimately, the increase in the stability of the seal rings increases the life of the seal assemblies and prevents the premature wear of the components housed internally of the seal assemblies.

Other aspects, objects and advantages of this invention can be obtained from a study of the drawings, the disclosure and the appended claims.

What is claimed is:

1. A seal assembly, comprising:

a first housing having a recess defined therein;

a second housing having a recess defined therein;

first and second seal rings having mutually confronting annual sealing faces positioned between said first and second housings;

first and second load rings each having first and second end portions and an annular surface extending therebetween, said load rings being positioned with their respective first end portions engaged with opposing ones of the first and second seal rings and their respective second end portions engaged with opposing ones of the first and second housings, said load rings being adapted to urge the respective annual sealing faces of the respective seal rings into engagement with one another the load rings being cup-shaped and columnar in cross-section; and an angled surface defined by the respective recesses of at least one of the first and second housings, the recess defines a first surface extending generally in an axial direction and a second surface extending from the first surface in a generally radial direction, the second surface defining the angled surface as being spaced from the first surface a preselected distance that places it adjacent the annular portion of the respective load ring engaged with the housing.

2. The seal assembly as set forth in claim 1 wherein the first housing is a stationary housing and the second housing is mounted for rotation with respect to the first housing.

3. The seal assembly as set forth in claim 2 wherein the second seal ring and second load ring rotate with the second housing relative to the first seal ring and first load ring.

4. The seal assembly as set forth in claim wherein the first and second seal rings move axially with respect to the first and second housings during relative rotation therebetween.

5. The seal assembly as set forth in claim 4 wherein the annular surface of the respective load rings moves into and out of engagement with the angled surface defined by the recess as a result of the movement of the load rings between the respective housings.

6. The seal assembly as set forth in claim 5 wherein the angled surface extends from the second surface at an angle that falls within a range of approximately 22 to 45 degrees.

7. A seal assembly, comprising:

a first housing;

a second housing positioned adjacent the first housing and mounted for relative rotation with respect thereto about an axis;

a pair of seal rings having mutually confronting annular seal faces;

a pair of first and second corresponding load rings each having a first end portion adapted to engage a corresponding seal ring and a second end portion adapted to engage one of the first and second housings to apply force to its corresponding seal ring to thereby maintain said seal faces in sealing engagement, each load ring having an outwardly directed annular surface extending between the first and second end portions thereof; and a pair of recesses defined in each of the first and second housings, each recess having a first axially directed surface, a second radially directed surface extending from the first surface and an angled surface extending from the second surface and being positioned for engagement with the annular surfaces of the respective load rings.

8. The seal assembly as set forth in claim 7 wherein the respective angled surfaces are adapted to be positioned for engagement with the annular surfaces of the respective load rings to stabilize the position of the load rings during relative rotation between the first and second housing.

9. The seal assembly as set forth in claim 8 wherein the angled surface falls within a range of approximately 22 to 45 degrees with respect to the second surface.

10. The seal assembly as set forth in claim 7 wherein the second end portions of the respective load rings have a first surface that is positioned for engagement with the first surface of each recess and a second surface that is positioned for engagement with the second surface of each recess.

* * * * *